United States Patent
Kuriki et al.

(10) Patent No.: US 10,128,498 B2
(45) Date of Patent: *Nov. 13, 2018

(54) POWER STORAGE DEVICE

(71) Applicant: SEMICONDUCTOR ENERGY LABORATORY CO., LTD., Atsugi-shi, Kanagawa-ken (JP)

(72) Inventors: Kazutaka Kuriki, Ebina (JP); Nobuhiro Inoue, Atsugi (JP); Kiyofumi Ogino, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 236 days.

This patent is subject to a terminal disclaimer.

(21) Appl. No.: 15/165,147

(22) Filed: May 26, 2016

(65) Prior Publication Data

US 2016/0268598 A1    Sep. 15, 2016

Related U.S. Application Data

(63) Continuation of application No. 13/307,045, filed on Nov. 30, 2011, now Pat. No. 9,362,556.

(30) Foreign Application Priority Data

Dec. 7, 2010 (JP) ................................ 2010-272903

(51) Int. Cl.
*H01M 4/36* (2006.01)
*H01G 11/06* (2013.01)
(Continued)

(52) U.S. Cl.
CPC ............ *H01M 4/366* (2013.01); *H01G 11/06* (2013.01); *H01G 11/50* (2013.01); *H01G 11/68* (2013.01);
(Continued)

(58) Field of Classification Search
CPC .. H01M 4/366; H01M 10/0525; H01M 4/386; H01M 4/382; H01M 4/661;
(Continued)

(56) References Cited

U.S. PATENT DOCUMENTS 5,338,625 A    8/1994  Bates et al.
6,063,142 A    5/2000  Kawakami et al.
(Continued)

FOREIGN PATENT DOCUMENTS

CN    001415123 A    4/2003
CN    001728418 A    2/2006
(Continued)

OTHER PUBLICATIONS

Kamins.T et al., "Ti-catalyzed Si nanowires by chemical vapor deposition: Microscopy and growth mechanisms", J. Appl. Phys. (Journal of Applied Physics) , Jan. 15, 2001, vol. 89, No. 2, pp. 1008-1016.

(Continued)

*Primary Examiner* — Lisa S Park
(74) *Attorney, Agent, or Firm* — Nixon Peabody LLP; Jeffrey L. Costellia

(57) ABSTRACT

A power storage device which has improved performance such as higher discharge capacity and in which deterioration due to peeling or the like of an active material layer is less likely to be caused is provided. In an electrode for the power storage device, phosphorus-doped amorphous silicon is used for the active material layer over a current collector as a material that can be alloyed with lithium, and niobium oxide is deposited over the active material layer as a layer containing niobium. Accordingly, the capacity of the power storage device can be increased and the cycle characteristics and the charge-discharge efficiency can be improved.

22 Claims, 10 Drawing Sheets

(51) Int. Cl.
  *H01G 11/50* (2013.01)
  *H01M 4/38* (2006.01)
  *H01M 4/66* (2006.01)
  *H01M 10/0562* (2010.01)
  *H01G 11/68* (2013.01)
  *H01G 11/72* (2013.01)
  *H01M 10/0525* (2010.01)
  *H01M 4/02* (2006.01)

(52) U.S. Cl.
  CPC ............ *H01G 11/72* (2013.01); *H01M 4/382* (2013.01); *H01M 4/386* (2013.01); *H01M 4/661* (2013.01); *H01M 10/0525* (2013.01); *H01M 10/0562* (2013.01); *H01M 2004/027* (2013.01); *Y02E 60/122* (2013.01); *Y02E 60/13* (2013.01); *Y02T 10/7022* (2013.01)

(58) Field of Classification Search
  CPC ........ H01M 10/0562; H01M 2004/027; H01G 11/68; H01G 11/72; H01G 11/06; H01G 11/50; Y02T 10/7022; Y02E 60/122; Y02E 60/13
  See application file for complete search history.

(56) References Cited

U.S. PATENT DOCUMENTS

| | | | |
|---|---|---|---|
| 6,235,427 B1 * | 5/2001 | Idota | H01M 4/134 29/623.1 |
| 6,333,128 B1 | 12/2001 | Sunagawa et al. | |
| 6,685,804 B1 | 2/2004 | Ikeda et al. | |
| 6,733,924 B1 | 5/2004 | Skotheim et al. | |
| 6,797,428 B1 | 9/2004 | Skotheim et al. | |
| 6,887,511 B1 | 5/2005 | Shima et al. | |
| 6,936,381 B2 | 8/2005 | Skotheim et al. | |
| 7,015,496 B2 | 3/2006 | Ohnuma et al. | |
| 7,192,673 B1 | 3/2007 | Ikeda et al. | |
| 7,235,330 B1 | 6/2007 | Fujimoto et al. | |
| 7,241,533 B1 | 7/2007 | Ikeda et al. | |
| 7,247,408 B2 | 7/2007 | Skotheim et al. | |
| 7,396,409 B2 | 7/2008 | Hatta et al. | |
| 7,410,728 B1 | 8/2008 | Fujimoto et al. | |
| 7,432,014 B2 | 10/2008 | Konishiike et al. | |
| 7,459,233 B2 | 12/2008 | Konishiike et al. | |
| 7,625,668 B2 | 12/2009 | Konishiike et al. | |
| 7,632,607 B2 | 12/2009 | Ugaji et al. | |
| 7,682,740 B2 | 3/2010 | Yong et al. | |
| 7,771,870 B2 | 8/2010 | Affinito et al. | |
| 7,785,730 B2 | 8/2010 | Affinito et al. | |
| 7,794,878 B2 | 9/2010 | Kogetsu | |
| 7,794,881 B1 | 9/2010 | Fujimoto et al. | |
| 8,076,024 B2 | 12/2011 | Affinito et al. | |
| 8,080,337 B2 | 12/2011 | Higuchi et al. | |
| 8,105,717 B2 | 1/2012 | Skotheim et al. | |
| 8,197,971 B2 | 6/2012 | Skotheim et al. | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 9,040,201 B2 | 5/2015 | Affinito et al. | |
| 9,065,149 B2 | 6/2015 | Skotheim et al. | |
| 9,362,556 B2 * | 6/2016 | Kuriki | H01G 11/06 |
| 2002/0048705 A1 | 4/2002 | Park et al. | |
| 2002/0168574 A1 | 11/2002 | Ahn et al. | |
| 2004/0101761 A1 | 5/2004 | Park et al. | |
| 2004/0126659 A1 | 7/2004 | Graetz et al. | |
| 2005/0008935 A1 | 1/2005 | Skotheim et al. | |
| 2005/0153208 A1 * | 7/2005 | Konishiike | H01M 4/134 429/245 |
| 2006/0040182 A1 | 2/2006 | Kawakami et al. | |
| 2007/0007239 A1 | 1/2007 | Lee et al. | |
| 2007/0221265 A1 | 9/2007 | Affinito et al. | |
| 2008/0003503 A1 | 1/2008 | Kawakami et al. | |
| 2009/0029264 A1 | 1/2009 | Nakazawa et al. | |
| 2009/0117462 A1 | 5/2009 | Okazaki et al. | |
| 2009/0136847 A1 | 5/2009 | Jeong et al. | |
| 2009/0169996 A1 * | 7/2009 | Zhamu | D01F 9/21 429/221 |
| 2009/0214958 A1 | 8/2009 | Park | |
| 2009/0311608 A1 | 12/2009 | Hirose et al. | |
| 2010/0104948 A1 | 4/2010 | Skotheim et al. | |
| 2010/0209784 A1 | 8/2010 | Yamazaki et al. | |
| 2011/0014524 A1 | 1/2011 | Skotheim et al. | |
| 2011/0084229 A1 | 4/2011 | Kawakami et al. | |
| 2011/0151290 A1 | 6/2011 | Cui et al. | |
| 2011/0159368 A1 * | 6/2011 | Hirose | H01M 4/134 429/219 |
| 2011/0159376 A1 | 6/2011 | Skotheim et al. | |
| 2011/0266654 A1 | 11/2011 | Kuriki et al. | |
| 2013/0280605 A1 | 10/2013 | Affinito et al. | |
| 2014/0205912 A1 | 7/2014 | Skotheim et al. | |
| 2015/0287986 A1 | 10/2015 | Affinito et al. | |
| 2015/0318552 A1 | 11/2015 | Skotheim et al. | |

FOREIGN PATENT DOCUMENTS

| | | |
|---|---|---|
| CN | 101604762 A | 12/2009 |
| EP | 0715366 A | 6/1996 |
| EP | 1677375 A | 7/2006 |
| JP | 08-213008 A | 8/1996 |
| JP | 11-213987 A | 8/1999 |
| JP | 2001-210315 A | 8/2001 |
| JP | 2002-083594 A | 3/2002 |
| JP | 2002-237294 A | 8/2002 |
| JP | 2003-246700 A | 9/2003 |
| JP | 2004-224576 A | 8/2004 |
| JP | 2004-281317 A | 10/2004 |
| JP | 2004-303593 A | 10/2004 |
| JP | 2005-141995 A | 6/2005 |
| JP | 2007-520867 | 7/2007 |
| JP | 2007-194076 A | 8/2007 |
| JP | 2008-016446 A | 1/2008 |
| JP | 2008-234988 A | 10/2008 |
| JP | 2009-164014 A | 7/2009 |
| JP | 2009-301879 A | 12/2009 |
| JP | 2010-250968 A | 11/2010 |
| JP | 2010-262752 A | 11/2010 |
| JP | 2010-282948 A | 12/2010 |
| JP | 2011-159534 A | 8/2011 |
| JP | 2011-249207 A | 12/2011 |
| KR | 2009-0129951 A | 12/2009 |
| WO | WO-2001/039302 | 5/2001 |
| WO | WO-2001/039303 | 5/2001 |
| WO | WO-2002/095849 | 11/2002 |
| WO | WO-2005/076388 | 8/2005 |
| WO | WO-2006/043470 | 4/2006 |
| WO | WO-2007/111895 | 10/2007 |
| WO | WO-2007/111901 | 10/2007 |
| WO | WO-2009/087791 | 7/2009 |
| WO | WO-2010/125467 | 11/2010 |
| WO | WO-2010/138617 | 12/2010 |

OTHER PUBLICATIONS

Kohno.H et al., "Silicon Nanoneedles Grown by a Simple Thermal Treatment Using Metal-Sulfur Catalysts", Jpn. J. Appl. Phys. (Japanese Journal of Applied Physics), Feb. 1, 2002, vol. 41, No. 2A, pp. 577-578.

Cui.L et al., "Crystalline-Amorphous Core-Shell Silicon Nanowires for High Capacity and High Current Battery Electrodes", Nano Letters, 2009, vol. 9, No. 1, pp. 491-495.

Written Opinion (Application No. PCT/JP2011/078224) dated Jan. 17, 20112.

International Search Report (Application No. PCT/JP2011/078224) dated Jan. 17, 20112.

Chinese Office Action (Application No. 201180058641.7) dated Feb. 28, 2015.

Chinese Office Action (Application No. 201180058641.7) dated Oct. 26, 2015.

(56) References Cited

OTHER PUBLICATIONS

Korean Office Action (Application No. 2013-7016891) dated Oct. 20, 2017.

* cited by examiner

POWER STORAGE DEVICE

TECHNICAL FIELD

The present invention relates to power storage devices.

Note that the power storage device indicates all elements and devices which have a function of storing power.

BACKGROUND ART

In recent years, a variety of power storage devices such as lithium secondary batteries, lithium ion capacitors, and air cells have been developed. In particular, a lithium secondary battery in which charge and discharge are performed by transfer of lithium ions between a positive electrode and a negative electrode has been attracting attention as a secondary battery with high output and high energy density.

An electrode for a power storage device is manufactured by forming an active material layer over one surface of a current collector. The active material layer is formed using an active material such as carbon or silicon, which can store and release ions behaving as carriers. For example, when an active material layer is formed using silicon or phosphorus-doped silicon, the theoretical capacity is higher than that in the case where the active material layer is formed using carbon, which is advantageous in increasing the capacity of a power storage device (e.g., Patent Document 1).

However, it is known that the volume of silicon serving as an active material is expanded when silicon occludes lithium ion and contracted when silicon releases lithium ion. Therefore, a problem arises in that an active material layer is powdered and peeled from a current collector along with charge and discharge of a battery, for example. As a result, the current collecting property in an electrode is decreased and the charge-discharge cycle characteristics are degraded. As a countermeasure against this, there is a method in which a surface of an active material layer is coated with carbon, copper, nickel, or the like to suppress powdering and peeling of silicon; however, such coating may suppress reaction between lithium and silicon and may reduce the charge-discharge capacity.

REFERENCE

Patent Document

[Patent Document 1] Japanese Published Patent Application No. 2001-210315

DISCLOSURE OF INVENTION

An object of one embodiment of the present invention is to provide a power storage device which has higher charge-discharge capacity and improved performance such as higher cycle characteristics.

In an electrode for the power storage device, a material that can be alloyed with lithium is used for an active material layer over a current collector, and a layer containing niobium is formed over the active material layer, whereby the capacity of the power storage device can be increased and the cycle characteristics and the charge-discharge efficiency can be improved.

The layer containing niobium is preferably formed using niobium oxide or niobium nitride. Further, the layer containing niobium may contain a niobium-lithium alloy such as $Li_2Nb_2O_5$. In addition, the layer containing niobium may be amorphous or crystalline.

$Li_2Nb_2O_5$ is formed by reaction between $Nb_2O_5$ and Li due to battery reaction. In charge and discharge thereafter, the $Li_2Nb_2O_5$ may be held, or Li may be desorbed from the $Li_2Nb_2O_5$ so that $Nb_2O_5$ is formed. Thus, the $Li_2Nb_2O_5$ formed over the active material layer functions as a stable inorganic solid electrolyte interface (SEI) instead of an organic SEI, thereby having effects of reduction in resistance, improvement in lithium diffusivity, suppression in volume expansion of the active material layer, and the like.

As the active material, a material that can be alloyed with lithium is preferably used; for example, a material containing silicon, tin, aluminum, or germanium can be used. Further, it is preferable that phosphorus or boron be added to the active material. With the use of such a material, the capacity of the power storage device can be increased.

The crystallinity of the active material may be any of the following: amorphous, microcrystalline, polycrystalline, and single crystal. Further, in the case of using silicon as the active material, for example, the active material layer can include a crystalline silicon region and a whisker-like crystalline silicon region which has a plurality of protrusions over the crystalline silicon region. Furthermore, a structure in which amorphous silicon exists around crystalline silicon may be employed. The whisker-like crystalline silicon region may include a protrusion having a bending or branching portion.

In the above, a crystalline silicon layer including the whisker-like crystalline silicon region can be formed over the current collector by a thermal chemical vapor deposition (CVD) method, a low pressure chemical vapor deposition (LPCVD) method, or a plasma CVD method, in which deposition is performed using a deposition gas containing silicon.

In this manner, the crystalline silicon region and the whisker-like crystalline silicon region which has a plurality of protrusions over the crystalline silicon region are provided in the active material layer, whereby the surface area of the active material is increased. In the power storage device, when the surface area of the active material is increased, the amount per unit mass of carrier ion such as lithium ion which is occluded by the active material per unit time or the amount per unit mass of carrier ion which is released from the active material per unit time is increased. The amount of carrier ion occluded per unit time or the amount of carrier ion released per unit time is increased, and thus the amount of carrier ion occluded or released at a high current density is increased; therefore, the discharge capacity or charge capacity of the power storage device can be increased.

For the current collector, a material with high conductivity can be used, such as a metal element typified by platinum, aluminum, or copper. Alternatively, the current collector may be formed using a metal element that forms silicide by reacting with silicon.

In the power storage device, an electrolyte layer which is formed between a negative electrode and a positive electrode facing the negative electrode can be formed using a liquid or a solid, and the electrolyte layer may contain niobium.

In one embodiment of the present invention, a multi-layer structure including a current collector, an active material layer, a layer containing niobium, and the like can be employed, whereby substances constituting the current collector, the active material layer, and the layer containing niobium are bonded to each other and thus the strength of the structure can be increased. Therefore, structural damage due to change in the volume of the active material layer along with charge and discharge is less likely to be caused. As a result, even after charge-discharge cycles, damage to the active material layer is suppressed; accordingly, increase in the resistance inside a battery and decrease in the capacity can be suppressed.

In one embodiment of the present invention, an electrode of a power storage device can be formed by a coating method. For example, a slurry in which silicon particles are mixed as an active material is applied over a current collector and then baked to form a coated electrode, and a layer containing niobium is formed over the coated electrode; thus, a coated electrode having high capacity and favorable cycle characteristics can be formed.

In one embodiment of the present invention, a material containing niobium can be used as an additive for the coated electrode used in the power storage device.

According to one embodiment of the present invention, the charge-discharge efficiency is improved and thus constant voltage (CV) charging becomes unnecessary. Consequently, the charging time is shortened and the cycle characteristics of a negative electrode material can be improved.

According to one embodiment of the present invention, a power storage device having improved battery performance such as higher discharge capacity or charge capacity can be provided. A power storage device in which deterioration due to peeling or the like of an active material layer in an electrode is suppressed can be provided.

BEST MODE FOR CARRYING OUT THE INVENTION

Figure 1:
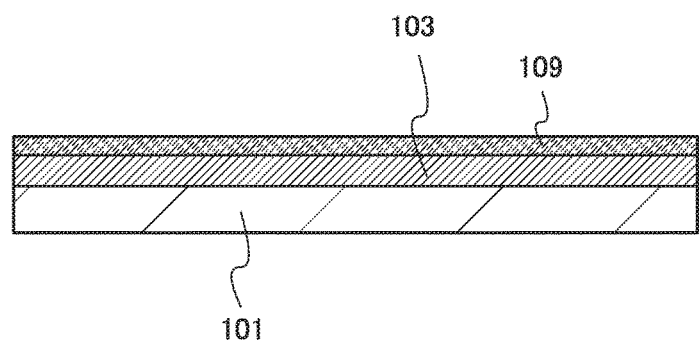
FIG. 1 illustrates an electrode of a power storage device.

Hereinafter, embodiments and an example of the present invention will be described with reference to the drawings. Note that the present invention is not limited to the following description and it will be easily understood by those skilled in the art that modes and details can be modified in various ways without departing from the spirit and scope of the present invention. Therefore, the present invention should not be construed as being limited to the following description of the embodiments and the example. In description referring to the drawings, in some cases, the same reference numerals are used in common for the same portions in different drawings. Further, in some cases, the same hatching patterns are applied to similar parts, and the similar parts are not necessarily designated by reference numerals.

(Embodiment 1)

In this embodiment, an electrode of a power storage device which is one embodiment of the present invention and a method for manufacturing the electrode will be described with reference to FIG. 1 and FIGS. 2A and 2B.

FIG. 1 illustrates one embodiment of an electrode of a power storage device. The electrode of the power storage device in FIG. 1 includes a current collector 101, an active material layer 103 provided over one surface of the current collector 101, and a layer containing niobium 109 provided over the active material layer 103.

The current collector 101 is formed as appropriate using a conductive material which can be used for a negative electrode current collector and has heat resistance high enough to withstand heat treatment to be performed later. Examples of the conductive material which can be used for the current collector include, but are not limited to, copper, platinum, aluminum, nickel, tungsten, molybdenum, titanium, and iron. Note that in the case of using aluminum for the current collector, an aluminum alloy to which an element that improves heat resistance, such as silicon, titanium, neodymium, scandium, or molybdenum, is added is preferably used. Alternatively, an alloy of any of the above conductive materials may be used.

Alternatively, the current collector 101 may be formed using a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, and nickel.

Alternatively, an oxide conductive material can be used for the current collector 101. Typical examples of the oxide conductive material include indium oxide containing tungsten oxide, indium zinc oxide containing tungsten oxide, indium oxide containing titanium oxide, indium tin oxide containing titanium oxide, indium tin oxide, indium zinc oxide, and indium tin oxide to which silicon oxide is added. Note that the current collector 101 may have a foil shape, a plate shape, or a net shape. With such a shape, the current collector 101 can hold its shape by itself, and a supporting substrate or the like is therefore not essential.

The active material layer 103 is preferably formed using a material that can be alloyed with an element whose ion carries electric charge. The ion which carries electric charge may be an ion of an alkali metal such as lithium or sodium; an ion of an alkaline earth metal such as calcium, strontium, or barium; a beryllium ion; a magnesium ion; or the like, and lithium is preferably used. As examples of a material that can be alloyed with lithium, which can be used for the active material layer 103, silicon, tin, aluminum, and germanium are given.

In the case of using silicon for the active material layer, a silicon layer can be formed over the current collector 101 by a plasma CVD method or the like. In this case, it is preferable that a source gas contain hydrogen as little as possible in forming the silicon layer. Thus, defects formed in silicon, such as dangling bonds, can be increased and insertion/extraction reaction of lithium ions can be easily caused.

The layer containing niobium 109 provided over the active material layer 103 can be formed using niobium oxide or niobium nitride. Instead of using niobium, an oxide or nitride of vanadium, tantalum, tungsten, zirconium, molybdenum, hafnium, chromium, or titanium can be used. In addition, the crystallinity of the layer containing niobium 109 may be any of an amorphous structure, a polycrystalline structure, and a single crystal structure.

Next, a method for forming the above electrode will be described with reference to FIGS. 2A and 2B.

Figure 2A:
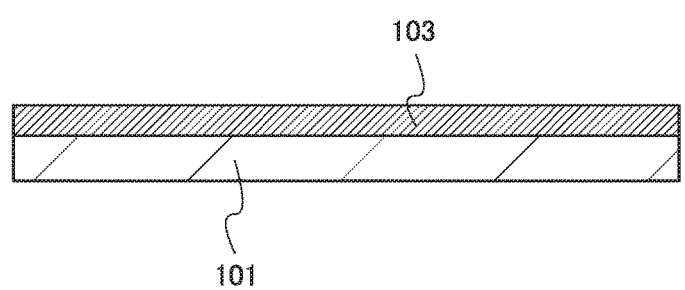
FIGS. 2A and 2B illustrate a manufacturing process of an electrode of a power storage device.

First, as illustrated in FIG. 2A, the active material layer 103 is formed over the current collector 101. For example, a titanium sheet may be used as the current collector 101, and a silicon layer may be formed as the active material layer 103 over the current collector 101 by a plasma CVD method. The silicon layer may contain an impurity element that generates a carrier, such as phosphorus or boron. For example, in order to make phosphorus be contained in the silicon layer, phosphine may be contained in a source gas. Note that there is no particular limitation on the crystallinity of the silicon layer. The silicon layer may be amorphous or crystalline. For example, amorphous silicon, microcrystalline silicon, or polycrystalline silicon can be used. Here, crystallization may be performed on the silicon layer. In the case where the silicon layer is subjected to crystallization, after the hydrogen concentration in the silicon layer is sufficiently reduced, the silicon layer may be crystallized by being subjected to heat treatment or laser irradiation.

Since the theoretical capacity of silicon is higher than that of graphite, an active material layer formed using silicon can have the same level of capacity as an active material layer formed using graphite even when the thickness of the active material layer formed using silicon is approximately 1/10 of that of the active material layer formed using graphite. For that reason, the weight and size of a secondary battery can be reduced; however, when the thickness of the active material layer is too small, the capacity of the secondary battery is decreased. Thus, the active material layer 103 is formed to a thickness greater than or equal to 50 nm and less than or equal to 10 μm, preferably greater than or equal to 100 nm and less than or equal to 5 μm. Even when the active material layer 103 is not formed to be thin, the capacity of the secondary battery can be increased by using silicon, which is preferable.

Figure 2B:
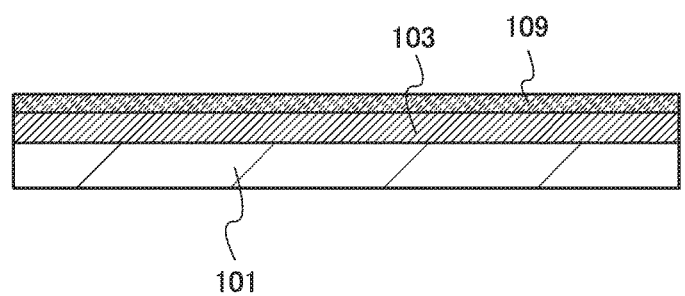

Next, as illustrated in FIG. 2B, the layer containing niobium 109 is formed over the active material layer 103. For example, a niobium oxide layer may be formed as the layer containing niobium 109. The niobium oxide layer can be formed by an evaporation method or the like with the use of a $Nb_2O_5$ target. Alternatively, the niobium oxide layer may be formed by a plating method, a thermal spraying method, a CVD method, a sputtering method, or the like.

The niobium oxide layer is preferably formed to a thickness greater than or equal to 1 nm and less than or equal to 1000 nm, further preferably greater than or equal to 80 nm and less than or equal to 500 nm. In addition, the composition of the formed niobium oxide layer can be expressed as $Nb_xO_y$ (x and y are each a positive integer).

Through the above steps, the electrode of the power storage device can be formed.

(Embodiment 2)

In this embodiment, an electrode of a power storage device which is one embodiment of the present invention and a method for manufacturing the electrode will be described with reference to FIG. 3 and FIGS. 4A and 4B.

Figure 3:
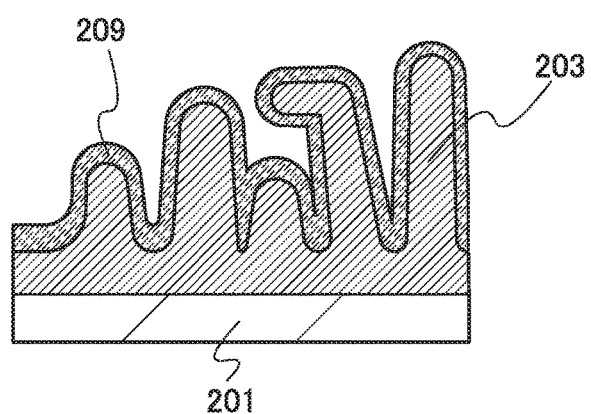
FIG. 3 illustrates an electrode of a power storage device.

FIG. 3 illustrates one embodiment of an electrode of a power storage device. The electrode of the power storage device in FIG. 3 includes a current collector 201, an active material layer 203 provided over one surface of the current collector 201, and a layer containing niobium 209 provided over the active material layer 203. Note that the active material layer 203 includes a crystalline silicon region and a whisker-like crystalline silicon region formed over the crystalline silicon region.

Next, a method for forming the above electrode will be described with reference to FIGS. 4A and 4B.

Figure 4A:
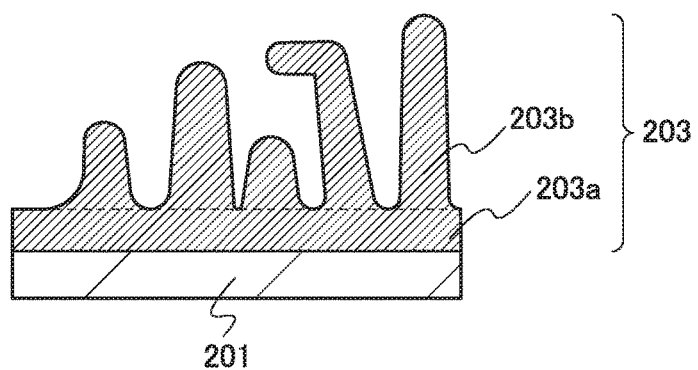
FIGS. 4A and 4B illustrate a manufacturing process of an electrode of a power storage device.

First, as illustrated in FIG. 4A, a crystalline silicon layer is formed as the active material layer 203 over the current collector 201 by an LPCVD method. Deposition of crystalline silicon by an LPCVD method is preferably performed at a temperature higher than or equal to 550° C. and lower than or equal to upper temperature limits of an LPCVD apparatus and the current collector 201, further preferably higher than or equal to 580° C. and lower than or equal to 650° C. As a source gas, a deposition gas containing silicon can be used. Examples of the deposition gas containing silicon include silicon hydride, silicon fluoride, and silicon chloride; typically, $SiH_2$, $Si_2H_6$, $SiF_4$, $SiCl_4$, $Si_2Cl_6$, and the like are given. Note that one or more of rare gases such as helium, neon, argon, and xenon, nitrogen, and hydrogen may be mixed in the source gas.

For the current collector 201, any of the materials listed above as a material for the current collector 101 can be used as appropriate.

Note that oxygen may be contained as an impurity in the active material layer 203. This is because oxygen is desorbed from a quartz chamber of the LPCVD apparatus by heating performed in the formation of the crystalline silicon layer as the active material layer 203 by the LPCVD method, and the oxygen diffuses into the crystalline silicon layer.

Note that an impurity element that generates a carrier, such as phosphorus or boron, may be added to the crystalline silicon layer. Such a crystalline silicon layer to which the impurity element that generates a carrier, such as phosphorus or boron, is added has higher conductivity, so that the conductivity of the electrode can be increased. Therefore, the discharge capacity or the charge capacity can be further increased.

The active material layer 203 includes a crystalline silicon region 203a and a whisker-like crystalline silicon region 203b formed over the crystalline silicon region 203a. Note that the interface between the crystalline silicon region 203a and the whisker-like crystalline silicon region 203b is not clear. Therefore, a plane that is at the same level as the bottom of the deepest valley among valleys formed between plural protrusions in the whisker-like crystalline silicon region 203b and is parallel to a surface of the current collector is regarded as the interface between the crystalline silicon region 203a and the whisker-like crystalline silicon region 203b.

The crystalline silicon region 203a is provided so as to cover the current collector 201. The whisker-like crystalline silicon region 203b has a plurality of protrusions which projects from unspecified regions of the crystalline silicon region 203a in unspecified directions.

Note that the plurality of protrusions in the whisker-like crystalline silicon region 203b may each have a columnar shape such as a cylinder shape or a prism shape, or a needle shape such as a cone shape or a pyramid shape. The top of the protrusion may be curved. The plurality of protrusions may include both a columnar protrusion and a needle-like protrusion. Further, a surface of the protrusion may be uneven. The surface unevenness can increase the surface area of the active material layer.

In the electrode of the power storage device described in this embodiment, the crystalline silicon layer functioning as the active material layer 203 includes the whisker-like crystalline silicon region 203b; therefore, the surface area is increased and thus the discharge capacity or charge capacity of the power storage device at a high current density can be increased.

Figure 4B:
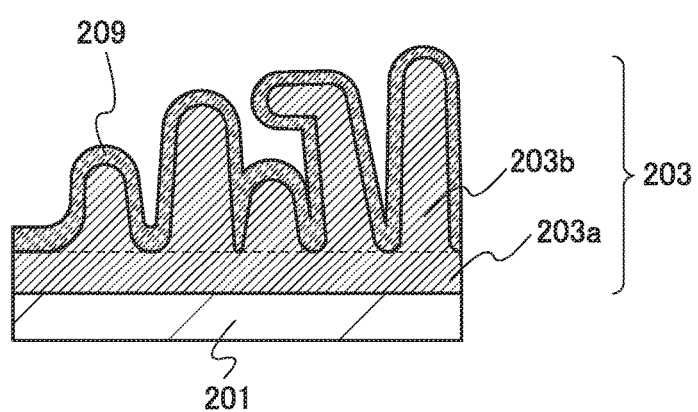

Next, as illustrated in FIG. 4B, the layer containing niobium 209 is formed over the active material layer 203. The layer containing niobium 209 can be formed in a manner similar to that of the layer containing niobium 109 in Embodiment 1.

Through the above steps, the electrode of the power storage device can be formed.

(Embodiment 3)

In this embodiment, an electrode of a power storage device which is one embodiment of the present invention and a method for manufacturing the electrode will be described below.

First, an active material, a conduction auxiliary agent, a binder, and a solvent are mixed to form a slurry. The slurry is prepared in such a manner that the conduction auxiliary agent is dispersed in the solvent containing the binder and then the active material is mixed therein. At this time, in order to improve the dispersion property, it is preferable to reduce the amount of the solvent so that a thick paste is obtained. After that, the solvent is added and the slurry is formed. The proportions of the active material, the conduction auxiliary agent, the binder, and the solvent can be adjusted as appropriate; the higher the proportions of the conduction auxiliary agent and the binder are, the higher the battery performance per the amount of the active material can be.

As the active material, a material that can be alloyed with lithium is preferably used; for example, a material containing silicon, tin, aluminum, or germanium can be used. In this embodiment, granular silicon is used. Note that favorable capacity and cycle characteristics can be obtained when the grain diameter of the granular silicon serving as the active material is small, and the grain diameter is preferably 100 nm or less.

As the conduction auxiliary agent, a material which is itself an electron conductor and does not cause chemical reaction with other materials in the battery device may be used. For example, carbon-based materials such as graphite, carbon fiber, carbon black, acetylene black, ketjenblack, and VGCF (registered trademark); metal materials such as copper, nickel, aluminum, and silver; and powder, fiber, and the like of mixtures thereof can be given. The conduction auxiliary agent is a material that assists conduction between active materials; it fills a space between active materials which are apart and makes conduction between the active materials.

As the binder, a polysaccharide, a thermoplastic resin, a polymer with rubber elasticity, and the like can be given. Examples thereof include starch, polyimide, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene-diene monomer (EPDM), sulfonated EPDM, styrene-butadiene rubber (SBR), butadiene rubber, fluororubber, and polyethylene oxide.

As the solvent, water, N-methyl-2-pyrrolidone, lactic acid ester, or the like can be used.

Next, the slurry formed above is applied over a current collector and dried using a hot plate, an oven, or the like. The drying can be performed at approximately 50° C. in the case of using an aqueous binder such as SBR. In the case of using an organic binder such as PVDF or polyimide, the drying is preferably performed at approximately 120° C. After that, punching is performed so that a desired shape is obtained, and main drying is performed. The main drying is preferably performed at approximately 170° C. for approximately 10 hours.

As the current collector, for example, a copper foil, a titanium foil, or a stainless steel foil can be used. In addition, the current collector can have a foil shape, a plate shape, a net shape, or the like as appropriate.

A layer containing niobium is formed over a coated electrode obtained through the above steps. The layer containing niobium can be formed by an evaporation method, for example, and is preferably formed using niobium oxide or niobium nitride.

Through the above steps, the electrode of the power storage device can be formed.

(Embodiment 4)

In this embodiment, a structure of a power storage device will be described with reference to FIGS. 5A and 5B.

First, a structure of a secondary battery will be described below as a power storage device. Here, a structure of a lithium ion battery, which is a typical example of the secondary battery, will be described.

Figure 5A:
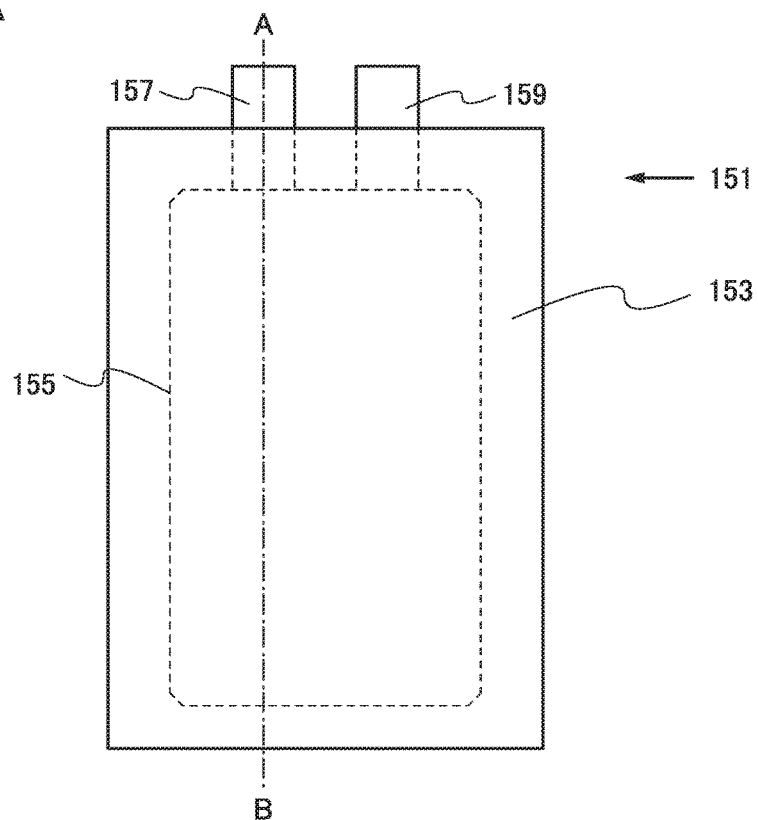
FIGS. 5A and 5B are a plan view and a cross-sectional view, respectively, which illustrate one embodiment of a power storage device.
Figure 5B:
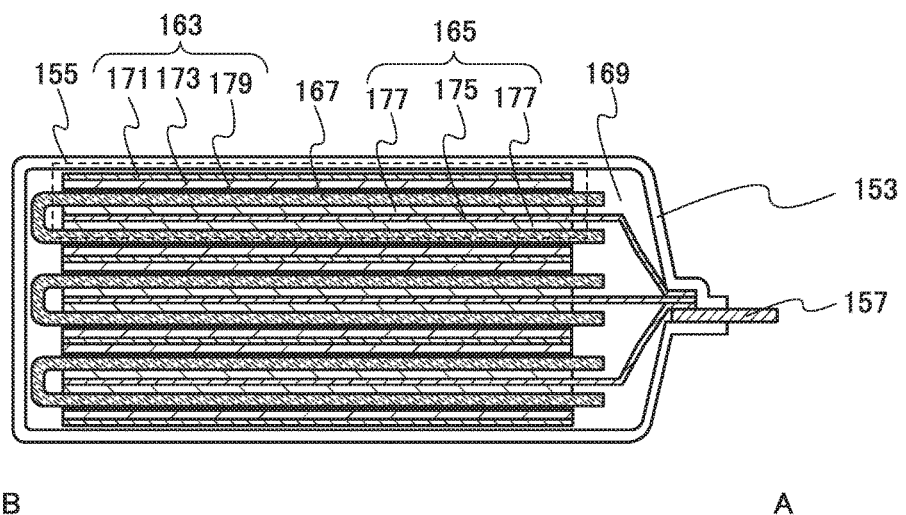

FIG. 5A is a plan view of a power storage device 151, and FIG. 5B is a cross-sectional view taken along dashed-dotted line A-B in FIG. 5A. In this embodiment, a sealed thin power storage device is described as the power storage device 151.

The power storage device 151 illustrated in FIG. 5A includes a power storage cell 155 in an exterior member 153. The power storage device 151 further includes terminal portions 157 and 159 which are connected to the power storage cell 155. As the exterior member 153, a laminate film, a polymer film, a metal film, a metal case, a plastic case, or the like can be used.

As illustrated in FIG. 5B, the power storage cell 155 includes a negative electrode 163, a positive electrode 165, a separator 167 provided between the negative electrode 163 and the positive electrode 165, and an electrolyte 169.

The negative electrode 163 includes a negative electrode current collector 171 and a negative electrode active material layer 173. Further, the negative electrode active material layer 173 is formed on one or both of the surfaces of the negative electrode current collector 171.

The positive electrode 165 includes a positive electrode current collector 175 and a positive electrode active material layer 177. Further, the positive electrode active material layer 177 is formed on one or both of the surfaces of the positive electrode current collector 175.

The negative electrode collector 171 is connected to the terminal portion 159. The positive electrode collector 175 is connected to the terminal portion 157. Further, the terminal portions 157 and 159 each partly extend outside the exterior member 153.

Note that although a sealed thin power storage device is described as the power storage device 151 in this embodiment, the power storage device can have a variety of structures; for example, a button power storage device, a cylindrical power storage device, or a rectangular power storage device can be used. Further, although the structure in which the positive electrode, the negative electrode, and the separator are stacked is described in this embodiment, a structure in which the positive electrode, the negative electrode, and the separator are rolled may be employed.

As the negative electrode current collector 171, the current collector 101 described in Embodiment 1 can be used.

For the negative electrode active material layer 173, phosphorus-doped amorphous silicon can be used as in the case of the active material layer 103 described in Embodiment 1. Note that silicon may be pre-doped with lithium. In addition, by forming the active material layer 103, which is formed using silicon, with the negative electrode current collector 171 held by a frame-like susceptor in an LPCVD apparatus, the active material layer 103 can be formed on both of the surfaces of the negative electrode current collector 171 at the same time; thus, the number of steps can be reduced.

Further, as in Embodiment 1, a layer containing niobium 179 is formed on the negative electrode active material layer 173. The layer containing niobium 179 can be formed using niobium oxide or niobium nitride.

Aluminum, stainless steel, or the like is used for the positive electrode current collector 175. The positive electrode current collector 175 can have a foil shape, a plate shape, a net shape, a film shape, or the like as appropriate.

For the positive electrode active material layer 177, a material that occludes and releases an ion which carries electric charge can be used. For example, the positive electrode active material layer 177 can be formed using $LiFeO_2$, $LiCoO_2$, $LiNiO_2$, $LiMn_2O_4$, $LiFePO_4$, $LiCoPO_4$, $LiNiPO_4$, $LiMn_2PO_4$, $V_2O_5$, $Cr_2O_5$, $MnO_2$, or another lithium compound as a material. Note that when carrier ions are alkali metal ions other than lithium ions or alkaline earth metal ions, the positive electrode active material layer 177 can be formed using, instead of lithium in the above lithium compounds, an alkali metal (e.g., sodium or potassium) or an alkaline earth metal (e.g., calcium, strontium, or barium) can be used.

As a solute of the electrolyte 169, a material in which lithium ions, i.e., carrier ions can transfer and stably exist is used. Typical examples of the solute of the electrolyte include lithium salt such as $LiClO_4$, $LiAsF_6$, $LiBF_4$, $LiPF_6$, and $Li(C_2F_5SO_2)_2N$. Note that when carrier ions are alkali metal ions other than lithium ions or alkaline earth metal ions, the solute of the electrolyte 169 can be formed using alkali metal salt such as sodium salt or potassium salt; alkaline earth metal salt such as calcium salt, strontium salt, or barium salt; beryllium salt; magnesium salt; or the like, as appropriate.

As a solvent of the electrolyte 169, a material which can transfer lithium ions (or other carrier ions) is used. As the solvent of the electrolyte 169, an aprotic organic solvent is preferably used. Typical examples of the aprotic organic solvent include ethylene carbonate, propylene carbonate, dimethyl carbonate, diethyl carbonate, γ-butyrolactone, acetonitrile, dimethoxyethane, and tetrahydrofuran, and one or more of these materials can be used. When a gelled polymer is used as the solvent of the electrolyte 169, safety against liquid leakage or the like is increased. In addition, the power storage device 151 can be thin and lightweight. Typical examples of the gelled polymer include a silicon gel, an acrylic gel, an acrylonitrile gel, polyethylene oxide, polypropylene oxide, and a fluorine-based polymer.

As the electrolyte 169, a solid electrolyte such as $Li_3PO_4$ can be used. Further, the electrolyte 169 may contain niobium. The electrolyte 169 may contain vinylene carbonate or the like.

An insulating porous material is used for the separator 167. Typical examples of the separator 167 include cellulose (paper), polyethylene, polypropylene, and glass fiber. A single layer or a stacked layer of any of these materials can be used.

A lithium ion battery has small memory effect, high energy density, and high discharge capacity. In addition, the output voltage of the lithium ion battery is high. For those reasons, the size and weight of the lithium ion battery can be reduced. Further, the lithium ion battery does not easily deteriorate owing to repetitive charge and discharge and can be used for a long time, so that cost can be reduced.

Next, a capacitor will be described as a power storage device. Typical examples of the capacitor include an electric double-layer capacitor and a lithium ion capacitor.

In the case of a capacitor, instead of the positive electrode active material layer 177 in the secondary battery illustrated in FIG. 5B, a material capable of reversibly occluding at least one of lithium ions (or other carrier ions) and anions may be used. Typically, the positive electrode active material layer 177 can be formed using active carbon, a conductive polymer, or a polyacene organic semiconductor (PAS).

The lithium ion capacitor has high efficiency of charge and discharge, capability of rapidly performing charge and discharge, and a long life to withstand repeated use.

By using the negative electrode described in Embodiment 1 as the negative electrode 163, a power storage device having high discharge capacity or charge capacity and improved cycle characteristics can be manufactured.

In addition, by using the current collector and the active material layer described in Embodiment 1 in a negative electrode of an air cell which is one embodiment of a power storage device, a power storage device having high discharge capacity or charge capacity and improved cycle characteristics can be manufactured.

As described above, in one embodiment of the present invention, a multi-layer structure including a current collector layer, an active material layer, a layer containing niobium, and the like can be employed, whereby substances included in the current collector layer, the active material layer, and the layer containing niobium are bonded to each other and thus the strength of the structure can be increased. Therefore, structural damage due to change in the volume of the active material layer along with charge and discharge is less likely to be caused. As a result, even after charge-discharge cycles, damage to the active material layer is suppressed; accordingly, increase in the resistance inside a battery and decrease in the capacity can be suppressed.

(Embodiment 5)

In this embodiment, application examples of the power storage device described in Embodiment 4 will be described with reference to FIGS. 6A to 6D.

The power storage device described in Embodiment 4 can be used in electronic devices such as cameras like digital cameras or video cameras, digital photo frames, mobile phones (also referred to as cellular phones or cellular phone devices), portable game machines, portable digital assistants, and audio reproducing devices. Further, the power storage device can be used in electric propulsion vehicles such as electric vehicles, hybrid vehicles, train vehicles, maintenance vehicles, carts, and electric wheelchairs. Here, examples of the electric propulsion vehicles will be described.

Figure 6A:
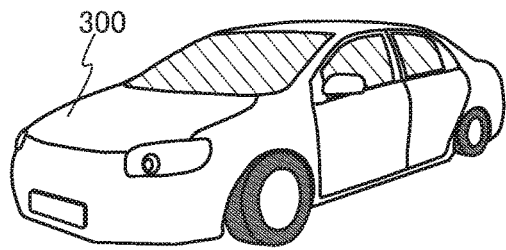
FIGS. 6A to 6D are perspective views illustrating application examples of a power storage device.
Figure 6B:
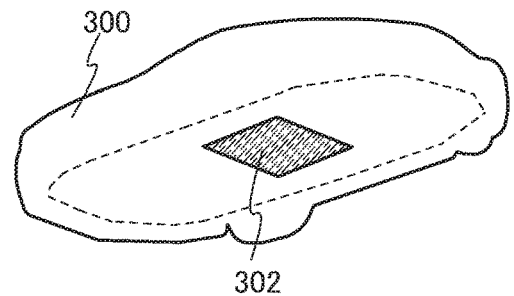

FIG. 6A illustrates a structure of a four-wheeled vehicle 300 which is one of the electric propulsion vehicles. The vehicle 300 is an electric vehicle or a hybrid vehicle. The vehicle 300 is an example in which a power storage device 302 is provided in a bottom portion. In order to clearly show the position of the power storage device 302 in the vehicle 300, FIG. 6B shows the outline of the vehicle 300 and the power storage device 302 provided in the bottom portion of the vehicle 300. The power storage device described in Embodiment 4 can be used as the power storage device 302. Charge of the power storage device 302 can be performed by external power supply using a plug-in technique or a wireless power feeding system.

Figure 6C:
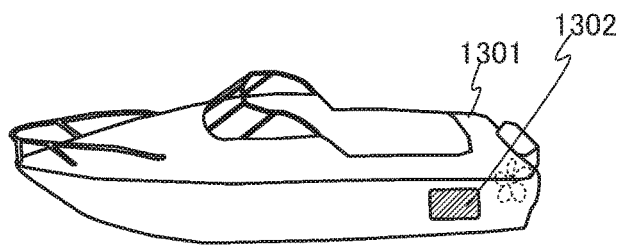

FIG. 6C illustrates a structure of a motorboat 1301 which is one of the electric propulsion vehicles. FIG. 6C illustrates the case where the motorboat 1301 includes a power storage device 1302 equipped on a side of the body of the boat. The power storage device described in Embodiment 4 can be used as the power storage device 1302. Charge of the power storage device 1302 can be performed by external power supply using a plug-in technique or a wireless power feeding system. For example, a power feeding device for charging the motorboat 1301 (i.e., for charging the power storage device 1302) may be equipped at a mooring in a harbor.

Figure 6D:
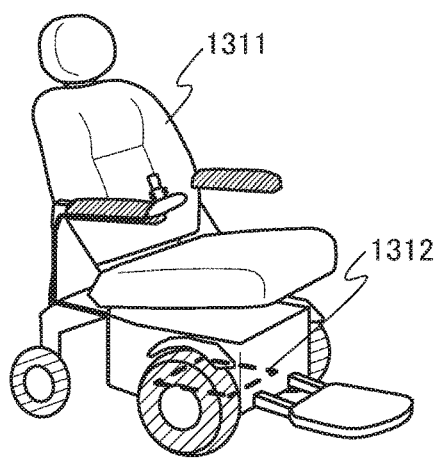

FIG. 6D illustrates a structure of an electric wheelchair 1311 which is one of the electric propulsion vehicles. FIG. 6D illustrates the case where the electric wheelchair 1311 includes a power storage device 1312 provided in a bottom portion. The power storage device described in Embodiment 4 can be used as the power storage device 1312. Charge of the power storage device 1312 can be performed by external power supply using a plug-in technique or a wireless power feeding system.

(Embodiment 6)

In this embodiment, an example in which a secondary battery that is an example of the power storage device according to one embodiment of the present invention is used in a wireless power feeding system (hereinafter referred to as an RF power feeding system) will be described with reference to block diagrams of FIG. 7 and FIG. 8. In each of the block diagrams, independent blocks show elements within a power receiving device and a power feeding device, which are classified according to their functions. However, it may be practically difficult to completely separate the elements according to their functions; in some cases, one element can involve a plurality of functions.

First, an RF power feeding system will be described with reference to FIG. 7.

A power receiving device 600 is an electronic device or an electric propulsion vehicle which is driven by electric power supplied from a power feeding device 700, and can be applied to another device which is driven by electric power, as appropriate. Typical examples of the electronic device include cameras like digital cameras or video cameras, digital photo frames, mobile phones (also referred to as cellular phones or cellular phone devices), portable game machines, portable digital assistants, audio reproducing devices, display devices, and computers. Typical examples of the electric propulsion vehicle include electric vehicles, hybrid vehicles, train vehicles, maintenance vehicles, carts, and electric wheelchairs. In addition, the power feeding device 700 has a function of supplying electric power to the power receiving device 600.

Figure 7:
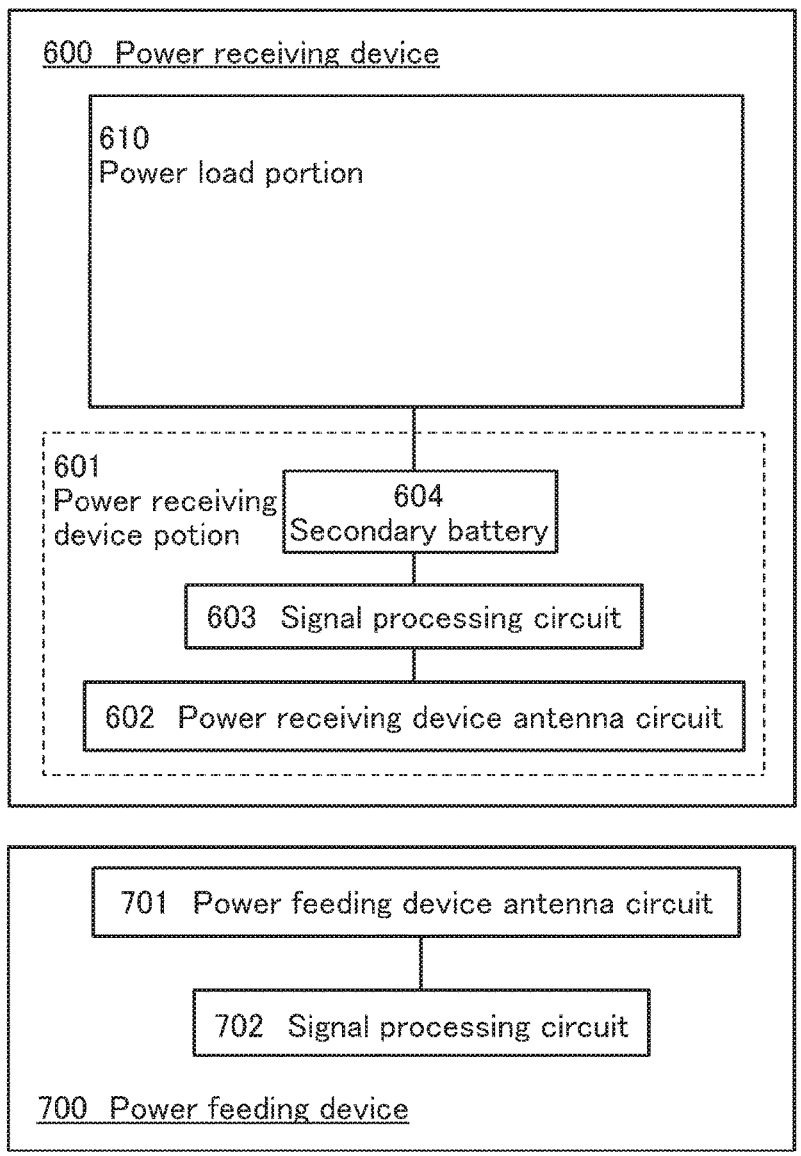
FIG. 7 illustrates an example of a structure of a wireless power feeding system.

In FIG. 7, the power receiving device 600 includes a power receiving device portion 601 and a power load portion 610. The power receiving device portion 601 includes at least a power receiving device antenna circuit 602, a signal processing circuit 603, and a secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 or transmitting a signal to the power feeding device antenna circuit 701. The signal processing circuit 603 processes a signal received by the power receiving device antenna circuit 602 and controls charge of the secondary battery 604 and supply of electric power from the secondary battery 604 to the power load portion 610. In addition, the signal processing circuit 603 controls operation of the power receiving device antenna circuit 602. That is, the signal processing circuit 603 can control the intensity, the frequency, or the like of a signal transmitted by the power receiving device antenna circuit 602. The power load portion 610 is a driving portion which receives electric power from the secondary battery 604 and drives the power receiving device 600. Typical examples of the power load portion 610 include a motor and a driving circuit. Another device which drives the power receiving device by receiving electric power can be used as the power load portion 610 as appropriate. The power feeding device antenna circuit 701 has a function of transmitting a signal to the power receiving device antenna circuit 602 or receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted by the power feeding device antenna circuit 701.

The secondary battery according to one embodiment of the present invention is used as the secondary battery 604 included in the power receiving device 600 in the RF power feeding system illustrated in FIG. 7.

With the use of the secondary battery according to one embodiment of the present invention in the RF power feeding system, the discharge capacity or the charge capacity (also referred to as the amount of power storage) can be higher than that of a conventional secondary battery. Therefore, the time interval of the wireless power feeding can be longer (frequent power feeding can be omitted).

In addition, with the use of the secondary battery according to one embodiment of the present invention in the RF power feeding system, the power receiving device 600 can be formed to be compact and lightweight if the discharge capacity or charge capacity with which the power load portion 610 can be driven is the same as that of a conventional secondary battery. Therefore, the total cost can be reduced.

Next, another example of the RF power feeding system will be described with reference to FIG. 8.

Figure 8:
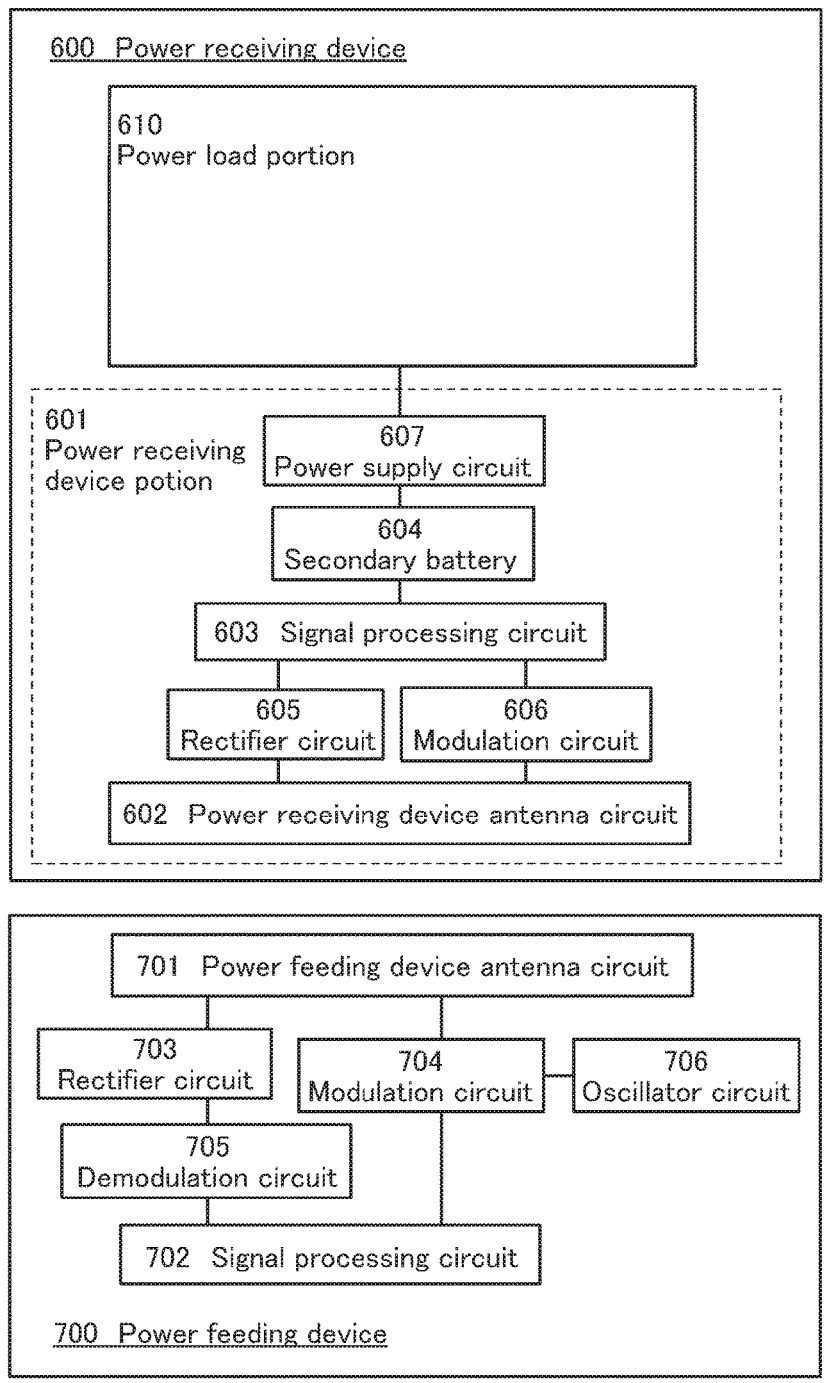
FIG. 8 illustrates an example of a structure of a wireless power feeding system.

In FIG. 8, the power receiving device 600 includes the power receiving device portion 601 and the power load portion 610. The power receiving device portion 601 includes at least the power receiving device antenna circuit 602, the signal processing circuit 603, the secondary battery 604, a rectifier circuit 605, a modulation circuit 606, and a power supply circuit 607. In addition, the power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 or transmitting a signal to the power feeding device antenna circuit 701. When the power receiving device antenna circuit 602 receives a signal transmitted by the power feeding device antenna circuit 701, the rectifier circuit 605 has a function of generating DC voltage from the signal received by the power receiving device antenna circuit 602. The signal processing circuit 603 has a function of processing a signal received by the power receiving device antenna circuit 602 and controlling charge of the secondary battery 604 and supply of electric power from the secondary battery 604 to the power supply circuit 607. The power supply circuit 607 has a function of converting voltage stored in the secondary battery 604 into voltage needed for the power load portion 610. The modulation circuit 606 is used when a certain response is transmitted from the power receiving device 600 to the power feeding device 700.

With the power supply circuit 607, electric power supplied to the power load portion 610 can be controlled. Thus, overvoltage application to the power load portion 610 can be suppressed, and deterioration or breakdown of the power receiving device 600 can be reduced.

In addition, with the modulation circuit 606, a signal can be transmitted from the power receiving device 600 to the power feeding device 700. Therefore, when the amount of charged power in the power receiving device 600 is judged to reach a certain amount, a signal is transmitted from the power receiving device 600 to the power feeding device 700 so that power feeding from the power feeding device 700 to the power receiving device 600 can be stopped. As a result, the secondary battery 604 is not fully charged, so that the maximum number of charge cycles of the secondary battery 604 can be increased.

The power feeding device antenna circuit 701 has a function of transmitting a signal to the power receiving device antenna circuit 602 or receiving a signal from the power receiving device antenna circuit 602. When a signal is transmitted to the power receiving device antenna circuit 602, the signal processing circuit 702 generates a signal which is transmitted to the power receiving device. The oscillator circuit 706 is a circuit which generates a signal with a constant frequency. The modulation circuit 704 has a function of applying voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when a signal is received from the power receiving device antenna circuit 602, the rectifier circuit 703 rectifies the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any circuit may be provided between circuits as long as the RF power feeding can be performed. For example, after the power receiving device 600 receives a signal and the rectifier circuit 605 generates DC voltage, a circuit such as a DC-DC converter or regulator that is provided in a subsequent stage may generate constant voltage. Thus, overvoltage application to the inside of the power receiving device 600 can be suppressed.

The secondary battery according to one embodiment of the present invention is used as the secondary battery 604 included in the power receiving device 600 in the RF power feeding system illustrated in FIG. 8.

With the use of the secondary battery according to one embodiment of the present invention in the RF power feeding system, the discharge capacity or the charge capacity can be higher than that of a conventional secondary battery. Therefore, the time interval of the wireless power feeding can be longer (frequent power feeding can be omitted).

In addition, with the use of the secondary battery according to one embodiment of the present invention in the RF power feeding system, the power receiving device 600 can be formed to be compact and lightweight if the discharge capacity or charge capacity with which the power load portion 610 can be driven is the same as that of a conventional secondary battery. Therefore, the total cost can be reduced.

Note that in the case where the secondary battery according to one embodiment of the present invention is used in the RF power feeding system and the power receiving device antenna circuit 602 and the secondary battery 604 overlap with each other, it is preferable that the impedance of the power receiving device antenna circuit 602 be not changed by deformation of the secondary battery 604 due to charge and discharge of the secondary battery 604 and deformation of an antenna due to the above deformation. When the impedance of the antenna is changed, in some cases, electric power is not supplied sufficiently. The secondary battery 604 may be placed in a battery pack formed using metal or ceramics, for example. Note that in that case, the power receiving device antenna circuit 602 and the battery pack are preferably separated from each other by several tens of micrometers or more.

In this embodiment, the charging signal has no limitation on its frequency and may have any band of frequency as long as electric power can be transmitted. For example, the frequency of the charging signal may be selected from any of 135 kHz in LF band, 13.56 MHz in HF band, 900 MHz to 1 GHz in UHF band, and 2.45 GHz in SHF band.

A signal transmission method may be properly selected from various methods including an electromagnetic coupling method, an electromagnetic induction method, an electromagnetic resonance method, and a microwave method. In order to prevent energy loss due to foreign substances containing moisture, such as rain and mud, the electromagnetic induction method or the electromagnetic resonance method using a low frequency band, specifically, VLF of 3 kHz to 30 kHz, LF of 30 kHz to 300 kHz, MF of 300 kHz to 3 MHz, or HF of 3 MHz to 30 MHz is preferably used.

This embodiment can be implemented in combination with any of the above embodiments.

EXAMPLE 1

In this example, a secondary battery which is one embodiment of the present invention will be described. In this example, the secondary battery which is one embodiment of the present invention and a secondary battery for comparison (hereinafter referred to as a comparative secondary battery) were manufactured and their battery characteristics were compared.

(Step of Manufacturing Electrode of Secondary Battery)

First, steps of manufacturing an electrode of the secondary battery will be described.

An active material layer was formed over a current collector, so that the electrode of the secondary battery was manufactured.

As a material for the current collector, titanium was used. As the current collector, a sheet of a titanium foil (also referred to as a titanium sheet) with a thickness of 100 µm was used.

As the active material layer, a phosphorus-doped amorphous silicon layer was used.

The phosphorus-doped amorphous silicon layer serving as the active material layer was formed over the titanium foil serving as the current collector by a plasma CVD method. The phosphorus-doped amorphous silicon layer was formed by a plasma CVD method under the following conditions: silane and phosphine were used as a source gas; silane and phosphine were introduced into a reaction chamber at flow rates of 60 sccm and 110 sccm, respectively; the pressure in the reaction chamber was 133 Pa; and as for the temperature in the reaction chamber, an upper heater was set to 400° C. and a lower heater was set to 500° C.

The phosphorus-doped amorphous silicon layer obtained in the above step was used as the active material layer of the secondary battery.

Next, a niobium oxide layer was formed over the formed active material layer by an evaporation method. The evaporation was performed in vacuum with the use of niobium oxide having a composition of $Nb_2O_5$ as an evaporation source. Further, the composition of the niobium oxide layer was measured by X-ray photoelectron spectroscopy (XPS). From the result, it was confirmed that the composition of the formed niobium oxide layer was substantially the same as the composition of the evaporation source, $Nb_2O_5$.

Through the above steps, the electrode of the secondary battery was manufactured.

(Step of Manufacturing Secondary Battery)

Next, steps of manufacturing the secondary battery of this example will be described.

The secondary battery was manufactured using the electrode obtained through the above steps. Here, a coin-type secondary battery was manufactured. A method for manufacturing the coin-type secondary battery will be described below with reference to FIG. 9.

Figure 9:
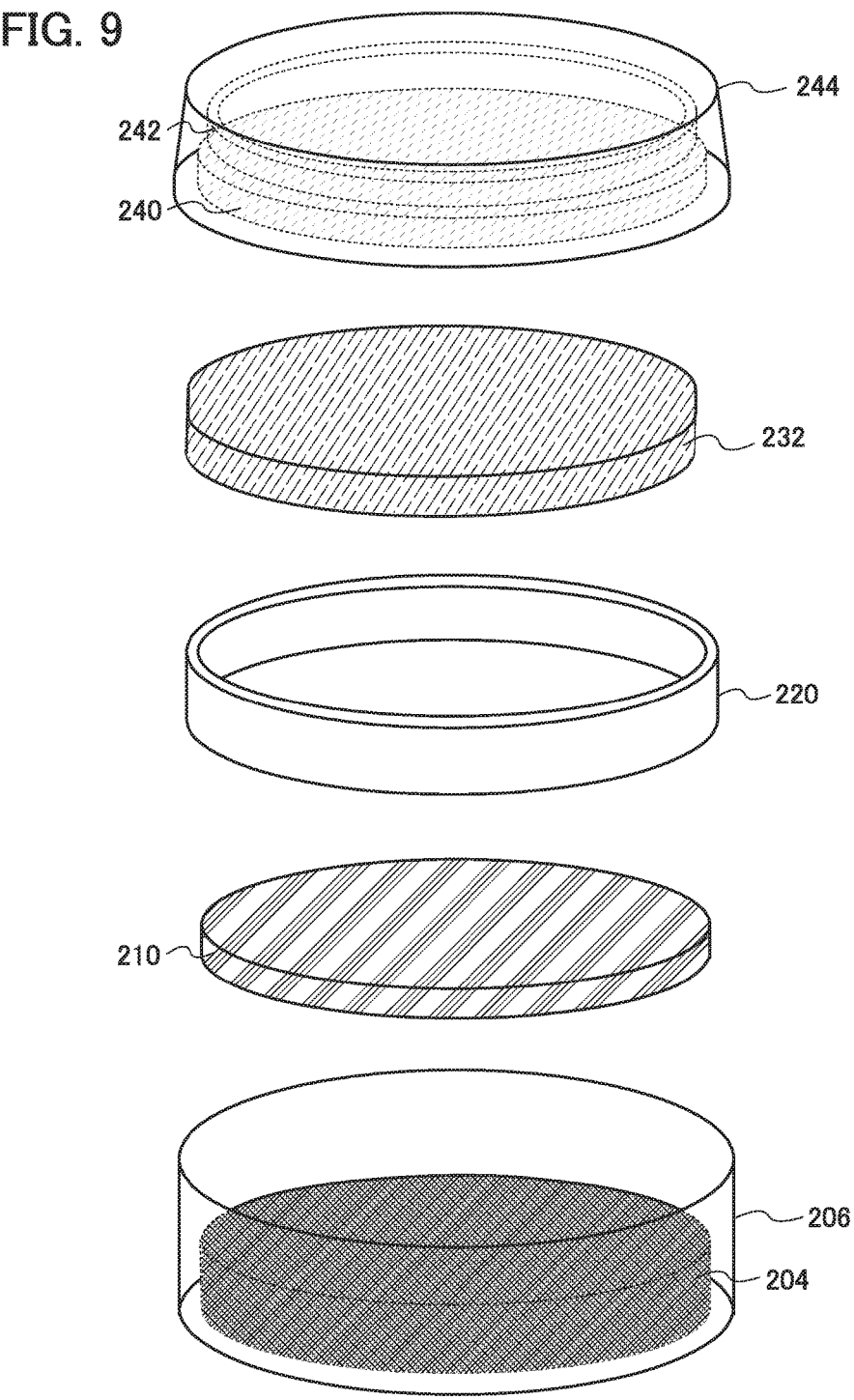
FIG. 9 illustrates a manufacturing process of a power storage device.

As illustrated in FIG. 9, the coin-type secondary battery includes an electrode 204, a reference electrode 232, a separator 210, an electrolyte (not illustrated), a housing 206, and a housing 244. Besides, the coin-type secondary battery includes a ring-shaped insulator 220, a spacer 240, and a washer 242. As the electrode 204, an electrode obtained through the above steps, in which an active material layer and a layer containing niobium were provided over a current collector, was used. In this example, a titanium foil was used as the current collector, and the active material layer had the stacked-layer structure including the phosphorus-doped amorphous silicon layer and the niobium oxide layer, which is described in Embodiment 1. The reference electrode 232 was formed using lithium metal (a lithium foil). The separator 210 was formed using polypropylene. The housing 206, the housing 244, the spacer 240, and the washer 242 each of which was made using stainless steel were used. The housing 206 and the housing 244 have a function of making external electrical connection of the electrode 204 and the reference electrode 232.

The electrode 204, the reference electrode 232, and the separator 210 were soaked in the electrolyte. Then, as illustrated in FIG. 9, the housing 206, the electrode 204, the separator 210, the ring-shaped insulator 220, the reference electrode 232, the spacer 240, the washer 242, and the housing 244 were stacked in this order so that the housing 206 was positioned at the bottom. The housing 206 and the housing 244 were pressed and crimped to each other with a "coin cell crimper". In such a manner, the coin-type secondary battery was manufactured.

The electrolyte in which $LiPF_6$ was dissolved in a mixed solvent of ethylene carbonate (EC) and diethyl carbonate (DEC) was used.

(Step of Manufacturing Electrode of Comparative Secondary Battery)

Next, steps of manufacturing an electrode of the comparative secondary battery will be described. A step of forming an active material layer of the comparative secondary battery is different from that of the secondary battery which is one embodiment of the present invention. The other structures of the comparative secondary battery are the same as those of the secondary battery which is one embodiment of the present invention; therefore, description of structures of a substrate, a current collector, and the like is omitted.

The active material layer of the comparative secondary battery had a single-layer structure of a phosphorus-doped amorphous silicon layer.

(Step of Manufacturing Comparative Secondary Battery)

Next, steps of manufacturing the comparative secondary battery will be described.

The active material layer was formed over a current collector in the above-described manner, so that the electrode of the comparative secondary battery was formed. The comparative secondary battery was manufactured using the electrode. The comparative secondary battery was manufactured in the same manner as the above secondary battery except for the formation method of the electrode.

(Characteristics Comparison Between Secondary Battery of the Present Invention and Comparative Secondary Battery)

Battery characteristics of the secondary battery and the comparative secondary battery which were manufactured in the above-described manner were compared using a charge-discharge measuring instrument. For the measurements of charge and discharge, a constant current mode was used, and charge and discharge were performed with a current of 0.05 mA only in initial charge and 0.15 mA in charge after the initial charge. The upper limit voltage was 1.0 V, and the lower limit voltage was 0.03 V. The capacity limit was 2000 (mAh/g), and the measurements were conducted at room temperature. The results are shown in Table 1 and FIG. 10.

TABLE 1

| | Charge-discharge efficiency Values in parentheses represent the discharge capacity of lithium ion (mAh/g) | | | |
| --- | --- | --- | --- | --- |
| | After 2 cycles | After 10 cycles | After 20 cycles | After 30 cycles |
| Comparative secondary battery | 96.0% (1920) | 98.3% (1966) | 98.0% (1962) | 93.1% (1500) |
| Secondary battery of the present invention | 100% (2000) | 100% (2000) | 100% (2000) | 100% (2000) |

Table 1 shows the proportion of the amount of released lithium ion to the amount of occluded lithium ion at varied charge-discharge cycle numbers; in other words, Table 1 shows results of evaluation of the charge-discharge efficiency. From these results, it was found that the secondary battery which included the electrode obtained by depositing niobium oxide over the active material layer had much higher charge-discharge efficiency than the comparative secondary battery which included the electrode obtained without depositing niobium oxide over the active material layer, and had an irreversible capacity of substantially 0. Note that the discharge capacity (mAh/g) was calculated on the assumption that the weight of each of the active material layers of the secondary battery and the comparative secondary battery was 0.255 mg.

Figure 10:
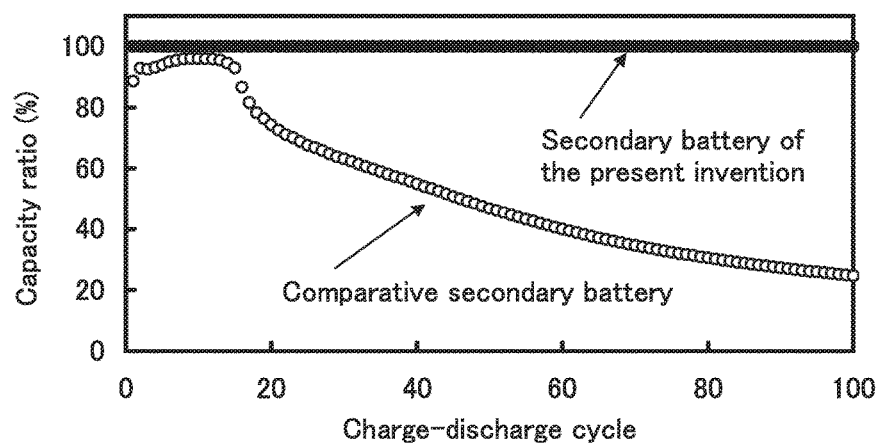
FIG. 10 shows battery characteristics of a power storage device.

FIG. 10 shows measurement results of the amount of released lithium ion with respect to the number of charge-discharge cycles. From these results, it was found that the lithium-ion discharge capacity of the secondary battery which included the electrode obtained by depositing niobium oxide over the active material layer was not decreased even when the number of charge-discharge cycles was increased, in contrast with that of the comparative secondary battery which included the electrode obtained without depositing niobium oxide over the active material layer.

From the results in Table 1 and FIG. 10, it was found that the charge-discharge efficiency and cycle characteristics of the secondary battery which included the electrode obtained by depositing niobium oxide over the active material layer were improved as compared with the comparative secondary battery which included the electrode obtained without depositing niobium oxide over the active material layer.

EXPLANATION OF REFERENCE

101: current collector, 103: active material layer, 109: layer containing niobium, 151: power storage device, 153: exterior member, 155: power storage cell, 157: terminal portion, 159: terminal portion, 163: negative electrode, 165: positive electrode, 167: separator, 169: electrolyte, 171: negative electrode current collector, 173: negative electrode active material layer, 175: positive electrode current collector, 177: positive electrode active material layer, 179: layer containing niobium, 201: current collector, 203: active material layer, 203a: crystalline silicon region, 203b: crystalline silicon region, 204: electrode, 206: housing, 209: layer containing niobium, 210: separator, 220: ring-shaped insulator, 232: reference electrode, 240: spacer, 242: washer, 244: housing, 300: vehicle, 302: power storage device, 600: power receiving device, 601: power receiving device portion, 602: power receiving device antenna circuit, 603: signal processing circuit, 604: secondary battery, 605: rectifier circuit, 606: modulation circuit, 607: power supply circuit, 610: power load portion, 700: power feeding device, 701: power feeding device antenna circuit, 702: signal processing circuit, 703: rectifier circuit, 704: modulation circuit, 705: demodulation circuit, 706: oscillator circuit, 1301: motorboat, 1302: power storage device, 1311: electric wheelchair, and 1312: power storage device.

This application is based on Japanese Patent Application serial no. 2010-272903 filed with the Japan Patent Office on Dec. 7, 2010, the entire contents of which are hereby incorporated by reference.

What is claimed is:

1. A power storage device comprising:
    an electrode comprising:
        a current collector;
        an active material layer comprising silicon over the current collector; and
        a layer comprising niobium over the active material layer,
    wherein the active material layer comprises a crystalline silicon region and a whisker-like crystalline silicon region over the crystalline silicon region, and
    wherein the active material layer is covered by the layer comprising niobium such that an interface between the crystalline silicon region and the whisker-like crystalline silicon is in contact with the layer comprising niobium.

2. A power storage device comprising:
    a negative electrode comprising:
        a current collector;
        an active material layer comprising silicon over the current collector; and
        a layer comprising niobium over the active material layer,
    an electrolyte in contact with the negative electrode; and
    a positive electrode facing the negative electrode with the electrolyte positioned between the positive electrode and the negative electrode,
    wherein the active material layer comprises a crystalline silicon region and a whisker-like crystalline silicon region over the crystalline silicon region, and
    wherein the active material layer is covered by the layer comprising niobium such that an interface between the crystalline silicon region and the whisker-like crystalline silicon is in contact with the layer comprising niobium.

3. A power storage device comprising:
    an electrode comprising:
        a current collector;
        an active material layer comprising silicon over the current collector; and
        a layer over the active material layer,
    wherein the layer over the active material layer comprises at least one element selected from vanadium, tantalum, tungsten, zirconium, molybdenum, hafnium, chromium, and titanium, and
    wherein the active material layer comprises a crystalline silicon layer and a whisker-like crystalline silicon region over the crystalline silicon layer,
    wherein the crystalline silicon layer is a plane layer spreading over the current collector, and
    wherein the whisker-like crystalline silicon region has a plurality of protrusions projecting from the crystalline silicon layer.

4. A power storage device comprising:
    an electrode comprising:
        a current collector;
        an active material layer comprising silicon over the current collector; and
        a layer over the active material layer,
    wherein the layer over the active material layer comprises at least one element selected from vanadium, tantalum, tungsten, zirconium, molybdenum, hafnium, chromium, and titanium,
    wherein the active material layer comprises a crystalline silicon region and a whisker-like crystalline silicon region over the crystalline silicon region, and
    wherein the active material layer is covered by the layer over the active material layer such that an interface between the crystalline silicon region and the whisker-like crystalline silicon is in contact with the layer over the active material layer.

5. The power storage device according to claim 1, wherein the layer comprising niobium comprises niobium oxide.

6. The power storage device according to claim 1, wherein the layer comprising niobium comprises niobium nitride.

7. The power storage device according to claim 1, wherein the current collector includes at least one element selected from copper, platinum, aluminum, nickel, tungsten, molybdenum, titanium, iron, silicon, neodymium, scandium, zirconium, hafnium, vanadium, niobium, tantalum, chromium, cobalt, indium, zinc, and tin.

8. An electronic device comprising the power storage device according to claim 1, wherein the electronic device is selected from a camera, a video camera, a digital photo frame, a mobile phone, a portable game machine, a portable digital assistant, and an audio reproducing device.

9. An electric propulsion vehicle comprising the power storage device according to claim 1, wherein the electric propulsion vehicle is selected from an electric vehicle, a hybrid vehicle, a train vehicle, a maintenance vehicle, a cart, and an electric wheelchair.

10. The power storage device according to claim 2, wherein the layer comprising niobium comprises niobium oxide.

11. The power storage device according to claim 1, wherein the layer comprising niobium comprises niobium nitride.

12. The power storage device according to claim 2, wherein the current collector includes at least one element selected from copper, platinum, aluminum, nickel, tungsten, molybdenum, titanium, iron, silicon, neodymium, scandium, zirconium, hafnium, vanadium, niobium, tantalum, chromium, cobalt, indium, zinc, and tin.

13. An electronic device comprising the power storage device according to claim 2, wherein the electronic device is selected from a camera, a video camera, a digital photo frame, a mobile phone, a portable game machine, a portable digital assistant, and an audio reproducing device.

14. An electric propulsion vehicle comprising the power storage device according to claim 2, wherein the electric propulsion vehicle is selected from an electric vehicle, a hybrid vehicle, a train vehicle, a maintenance vehicle, a cart, and an electric wheelchair.

15. The power storage device according to claim 3, wherein the layer over the active material layer comprises titanium oxide.

16. The power storage device according to claim 3, wherein the current collector includes at least one element selected from copper, platinum, aluminum, nickel, tungsten, molybdenum, titanium, iron, silicon, neodymium, scandium, zirconium, hafnium, vanadium, niobium, tantalum, chromium, cobalt, indium, zinc, and tin.

17. An electronic device comprising the power storage device according to claim 3, wherein the electronic device is selected from a camera, a video camera, a digital photo frame, a mobile phone, a portable game machine, a portable digital assistant, and an audio reproducing device.

18. An electric propulsion vehicle comprising the power storage device according to claim 3, wherein the electric propulsion vehicle is selected from an electric vehicle, a hybrid vehicle, a train vehicle, a maintenance vehicle, a cart, and an electric wheelchair.

19. The power storage device according to claim 4, wherein the layer over the active material layer comprises titanium oxide.

20. The power storage device according to claim 4, wherein the current collector includes at least one element selected from copper, platinum, aluminum, nickel, tungsten, molybdenum, titanium, iron, silicon, neodymium, scandium, zirconium, hafnium, vanadium, niobium, tantalum, chromium, cobalt, indium, zinc, and tin.

21. An electronic device comprising the power storage device according to claim 4, wherein the electronic device is selected from a camera, a video camera, a digital photo frame, a mobile phone, a portable game machine, a portable digital assistant, and an audio reproducing device.

22. An electric propulsion vehicle comprising the power storage device according to claim 4, wherein the electric propulsion vehicle is selected from an electric vehicle, a hybrid vehicle, a train vehicle, a maintenance vehicle, a cart, and an electric wheelchair.

* * * * *